US008194216B2

(12) United States Patent
Um et al.

(10) Patent No.: US 8,194,216 B2
(45) Date of Patent: Jun. 5, 2012

(54) DISPLAY SUBSTRATE AND LIQUID CRYSTAL DISPLAY DEVICE HAVING THE SAME

(75) Inventors: Yoon-Sung Um, Yongin-si (KR); Jae-Jin Lyu, Yongin-si (KR); Seung-Beom Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 994 days.

(21) Appl. No.: 12/173,370

(22) Filed: Jul. 15, 2008

(65) Prior Publication Data
US 2009/0085853 A1   Apr. 2, 2009

(30) Foreign Application Priority Data
Oct. 2, 2007   (KR) .................. 10-2007-0099112

(51) Int. Cl.
*G02F 1/1343*   (2006.01)
(52) U.S. Cl. ........... 349/139; 349/38; 349/48; 349/143; 349/187; 345/93
(58) Field of Classification Search ............ 349/48, 349/38, 43, 39, 139, 143, 187; 345/92, 87, 345/93
See application file for complete search history.

(56) References Cited

U.S. PATENT DOCUMENTS
7,688,393 B2 *  3/2010  Ueda et al. ................. 349/48

FOREIGN PATENT DOCUMENTS
| JP | 2006133577 A | 5/2006 |
|---|---|---|
| KR | 1020050018520 A | 2/2005 |
| KR | 1020060052245 A | 5/2006 |

* cited by examiner

*Primary Examiner* — Thoi Duong
(74) *Attorney, Agent, or Firm* — Cantor Colburn LLP (57) ABSTRACT

A display substrate includes an insulation substrate, an (n)-th gate line, a data line, first and second source electrodes, first and second drain electrodes, a pixel electrode, a third drain electrode, and a storage line. The first source electrode overlaps a first portion of the (n)-th gate line and is electrically connected to the data line. The first and second drain electrodes overlap a second portion of the (n)-th gate line. The pixel electrode is connected to the first drain electrode. The second source electrode overlaps a first portion of an (n+1)-th gate line, while the third drain electrode overlaps a second portion thereof. The storage line overlaps a portion of each of the pixel electrode and the second and third drain electrodes. The second source electrode is formed by extending the second drain electrode in a direction substantially from the (n)-th gate line towards the (n+1)-th gate line.

18 Claims, 5 Drawing Sheets

DISPLAY SUBSTRATE AND LIQUID CRYSTAL DISPLAY DEVICE HAVING THE SAME

This application claims priority to Korean Patent Application No. 2007-99112, filed on Oct. 2, 2007, and all the benefits accruing therefrom under 35 U.S.C. §119, the contents of which in its entirety are herein incorporated by reference.

BACKGROUND OF THE INVENTION

1. Field of the Invention

The present invention relates to a display substrate and a liquid crystal display ("LCD") device including the display substrate. More particularly, the present invention relates to a display substrate having decreased power consumption and an LCD device including the display substrate.

2. Description of the Related Art

Generally, a liquid crystal display ("LCD") device includes an LCD panel which displays an image by varying light transmittance of liquid crystal, and a backlight assembly disposed below the LCD panel which provides the LCD panel with light. The LCD panel includes an array substrate including a plurality of thin-film transistors ("TFTs") disposed thereon, an opposite substrate facing the array substrate, and a liquid crystal layer disposed between the array substrate and the opposite substrate. Recently, as larger LCD panels and LCD panels which display high resolution images have been developed, power consumption of the LCD panel has increased. As a result, various methods for decreasing power consumption have been developed, such as a common voltage swing type method and an active level shift ("ALS") type method, for example.

In both the common voltage swing type and the ALS type methods, an effective voltage applied to a pixel electrode is increased, instead of increasing a data voltage provided from a driving integrated chip ("IC"). More specifically, in the common voltage swing type method, a pixel voltage and a storage voltage of a storage electrode which forms a storage capacitor are alternatively inverted each horizontal interval, thereby increasing a mean voltage of the pixel electrode. However, this results in undesirable flicker effects which adversely affects the LCD panel employing the common voltage swing type method.

In the ALS type method, a storage voltage of the storage electrode is alternatively inverted each frame interval, thereby increasing a pixel voltage of the pixel electrode. However, this requires an additional driving circuit, thereby increasing manufacturing costs and subsequently decreasing manufacturing yield of the LCD panel.

BRIEF SUMMARY OF THE INVENTION

The present invention has been made in an effort to solve the above stated problems, and an exemplary embodiment of the present invention provides a display substrate including a pixel structure which induces an effective voltage, having a level higher than a level of a data voltage, in a pixel electrode. More specifically, in an exemplary embodiment of the present invention, a display substrate includes an insulation substrate, an (n)-th gate line (where n is a natural number), a data line, a first source electrode, a second source electrode, a first drain electrode, a second drain electrode, a pixel electrode, a third drain electrode, and a storage line. The (n)-th gate line is formed in a first direction on the insulation substrate, and the data line is electrically isolated from the (n)-th gate line and is formed in a second direction and formed in a second direction substantially perpendicular to the first direction. The first source electrode overlaps at least a first portion of the (n)-th gate line. The first source electrode is electrically connected to the data line. The first drain electrode and the second drain electrode each overlap at least a second portion of the (n)-th gate line. The pixel electrode is electrically connected to the first drain electrode. The second source electrode overlaps at least a first portion of an (n+1)-th gate line. The second source electrode is formed by extending the second drain electrode in substantially the second direction from the (n)-th gate line towards the (n+1)-th gate line. The third drain electrode overlaps at least a second portion of the (n+1)-th gate line. The storage line overlaps at least one of a first portion of the pixel electrode, a portion of the second drain electrode, and a portion of the third drain electrode.

According to an exemplary embodiment, the display substrate further includes a first storage capacitor which overlaps at least a second portion of the pixel electrode and a first portion of the storage line, a voltage down capacitor which overlaps at least a portion of the third drain electrode and a second portion of the storage line, a second storage capacitor which overlaps at least a portion of the second drain electrode and a third portion of the storage line, and a voltage up capacitor which overlaps at least a third portion of the pixel electrode and at least a portion of the third drain electrode.

In an alternative exemplary embodiment of the present invention, a liquid crystal display ("LCD") device includes a first display substrate, a second display substrate, and a liquid crystal layer. The first display substrate includes an insulation substrate, an (n)-th gate line (where n is a natural number), a data line, a first source electrode, a second source electrode, a first drain electrode, a second drain electrode, a pixel electrode, a third drain electrode, and a storage line. The (n)-th gate line is formed in a first direction on the insulation substrate, and the data line is electrically isolated from the (n)-th gate line and is formed in a second direction and formed in a second direction substantially perpendicular to the first direction. The first source electrode overlaps at least a first portion of the (n)-th gate line. The first source electrode is electrically connected to the data line. The first drain electrode and the second drain electrode each overlap at least a second portion of the (n)-th gate line. The pixel electrode is electrically connected to the first drain electrode. The second source electrode overlaps at least a first portion of an (n+1)-th gate line. The second source electrode is formed by extending the second drain electrode in substantially the second direction from the (n)-th gate line towards the (n+1)-th gate line. The third drain electrode overlaps at least a second portion of the (n+1)-th gate line. The storage line overlaps at least one of a first portion of the pixel electrode, a portion of the second drain electrode, and a portion of the third drain electrode.

The second display substrate includes a second insulation substrate and a common electrode formed on the second insulation substrate substantially facing the first insulation substrate.

The liquid crystal layer is interposed between the first display substrate and the second display substrate.

In another alternative exemplary embodiment of the present invention, an LCD device includes a first thin-film transistor ("TFT"), a liquid crystal capacitor, a first storage capacitor, a second TFT, a second storage capacitor, a connecting transistor, a voltage down capacitor, and a voltage up capacitor. The first TFT includes a control terminal electrically connected to an (n)-th gate line and an input terminal electrically connected to a (m)-th data line. The liquid crystal capacitor includes a liquid crystal layer electrically connected to an output terminal of the first TFT. The first storage capacitor is electrically connected to the output terminal of the first TFT and the liquid crystal capacitor. The second TFT includes a control terminal electrically connected to the (n)-th gate line and an input terminal electrically connected to the (m)-th data line. The second storage capacitor is electrically connected to an output terminal of the second TFT. The connecting transistor includes a control terminal electrically connected to an (n+1)-th gate line, and an input terminal electrically connected to the second storage capacitor. The voltage down capacitor is electrically connected to an output terminal of the connecting transistor. The voltage up capacitor is electrically connected to the output terminal of the connecting transistor and the output terminal of the first TFT.

In still another alternative exemplary embodiment, a method for driving an LCD device includes: controlling a first thin-film transistor with an (n)-th gate line, where n is a natural number, the first thin-film transistor comprising a first source electrode as an input terminal and a first drain electrode as an output terminal; controlling a second thin-film transistor with the (n)-th gate line, the second thin-film transistor comprising the first source electrode as an input terminal and a second drain electrode as an output terminal; and controlling a connecting transistor with an (n+1)-th gate line, the connecting transistor comprising a second source electrode as an input terminal and a third drain electrode as an output terminal.

In the display substrate and the LCD device including the display substrate according to exemplary embodiments of the present invention, a pixel having a charge sharing structure is configured in the pixel electrode, and an effective voltage, which is higher than a data voltage applied through the data line, is induced therein. Therefore, power consumption of the LCD device is substantially reduced and/or effectively decreased.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

It will be understood that although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including," when used in this specification, specify the presence of stated features, regions, integers, steps, operations, elements and/or components, but do not preclude the presence or addition of one or more other features, regions, integers, steps, operations, elements, components and/or groups thereof.

Furthermore, relative terms, such as "lower" or "bottom" and "upper" or "top" may be used herein to describe one element's relationship to other elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on the "upper" side of the other elements. The exemplary term "lower" can, therefore, encompass both an orientation of "lower" and "upper," depending upon the particular orientation of the figure. Similarly, if the device in one of the figures were turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

Exemplary embodiments of the present invention are described herein with reference to cross section illustrations which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

Figure 1:
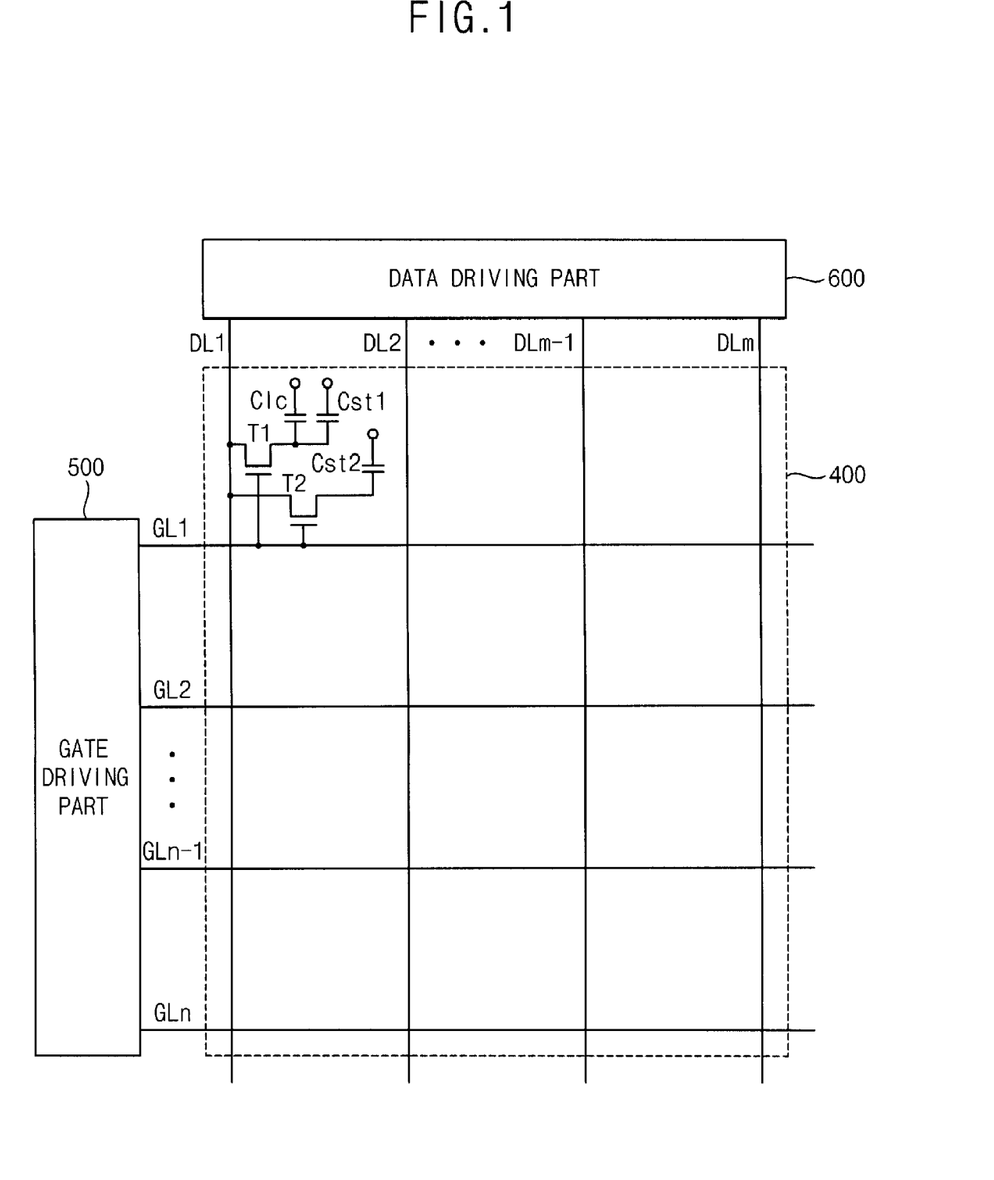
FIG. 1 is a block diagram schematically illustrating an exemplary embodiment of a liquid crystal display ("LCD") device according to the present invention.

FIG. 1 is a block diagram schematically illustrating an exemplary embodiment of a liquid crystal display ("LCD") device according to the present invention.

Referring to FIG. 1, an LCD device according to an exemplary embodiment of the present invention includes an LCD panel 400, a gate driving part 500 and a data driving part 600. The LCD panel 400 includes a plurality of signal lines including a plurality of gate lines GL1 to GLn and a plurality of data lines DL1 to DLm, where n and m are natural numbers.

Gate lines of the plurality of gate lines GL1 to GLn extend in a first substantially horizontal direction on the LCD panel 400, and data lines of the plurality of data lines DL1 to DLm extend in a second substantially vertical direction, e.g., the second direction is substantially perpendicular to the first direction, on the LCD panel 400. In addition, the data lines of the plurality of data lines DL1 to DLm overlap the gate lines of the plurality of gate lines GL1 to GLn, as shown in FIG. 1.

Pixels of a plurality of pixels are electrically connected to respective gate lines of the plurality of gate lines GL1 to GLn and respective data lines of the plurality of data lines DL1 to DLm. For example, FIG. 1 illustrates a pixel electrically connected to a data line DL1 and a gate line GL1. In addition, and still referring to FIG. 1, each of the pixels includes a first thin-film transistor ("TFT") T1, a second TFT T2, a liquid crystal capacitor Clc, a first storage capacitor Cst1, and a second storage capacitor Cst2. The first TFT T1 and the second TFT T2 are electrically connected to a respective gate line of the plurality of gate lines GL1 to GLn and a respective data line of the plurality of data lines DL1 to DLm. The liquid crystal capacitor Clc is electrically connected to the first TFT T1 and is capacitively coupled the second TFT T2. The first storage capacitor Cst1 and the second storage capacitor Cst2 are electrically connected to the first TFT T1 and the second TFT T2, respectively.

Each gate line of the plurality of gate lines GL1 to GLn transfers a gate signal to the first TFT T1 and the second TFT T2, and each data line of the plurality of data lines DL1 to DLm transfers a data voltage, which corresponds to a data signal, to the first TFT T1 and the second TFT T2.

The first TFT T1 and the second TFT T2 each include a control terminal, an input terminal and an output terminal. The control terminal of each of the first TFT T1 and the second TFT T2 is electrically connected to a respective gate line of the plurality of gate lines GL1 to GLn, each input terminal thereof is electrically connected to a respective data line of the plurality of data lines DL1 to DLm, and the output terminal of the first TFT T1 is electrically connected to the liquid crystal capacitor Clc and the first storage capacitor Cst1, while the output terminal of the second TFT T2 is connected to the second storage capacitor Cst2.

The liquid crystal capacitor Clc is electrically connected to the output terminal of the first TFT T1 and a common electrode (not shown). The liquid crystal capacitor Clc is capacitively coupled to the second TFT T2 and the common electrode (not shown).

In an exemplary embodiment, the first storage capacitor Cst1 and the second storage capacitor Cst2 are formed by overlapping an output terminal of the first TFT T1 and the second TFT T2 with a storage line (not shown).

The gate driving part 500 is electrically connected to the plurality of gate lines GL1 and GLn to provide the gate lines GL1 to GLn with a gate signal which activates, e.g., turns on, the first TFT T1 and the second TFT T2 of a corresponding pixel.

The data driving part 600 is electrically connected to the plurality of data lines DL1 to DLm to provide the data lines DL1 to DLm with a data voltage which corresponds to a data signal supplied from an external source (not shown).

In an exemplary embodiment, the first TFT T1 and the second TFT T2 include a metal oxide semiconductor ("MOS") transistor, but alternative exemplary embodiments are not limited thereto. Further, the MOS transistor may include a TFT including polysilicon ("p-Si") as a channel area, but alternative exemplary embodiments are not limited thereto.

Figure 2:
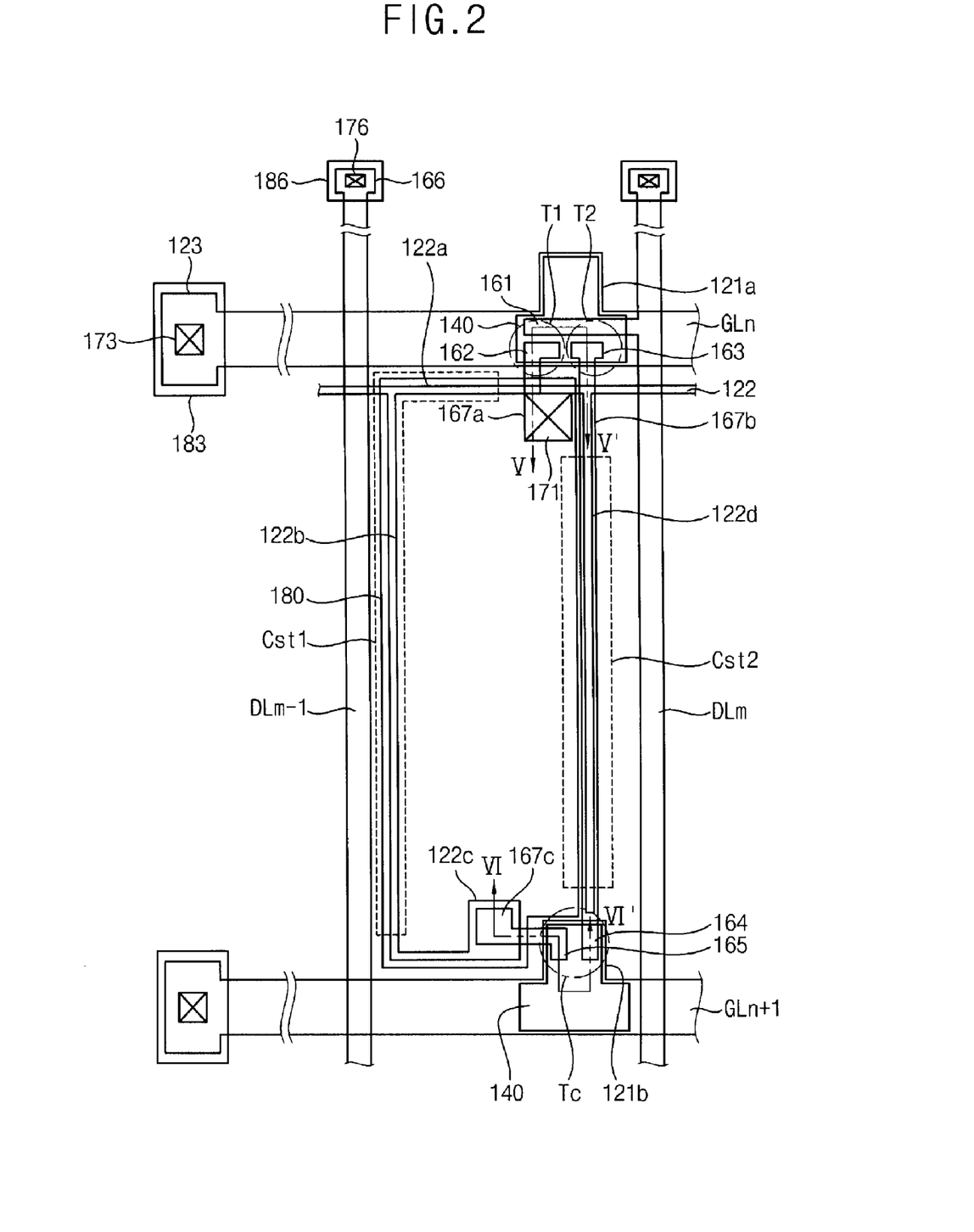
FIG. 2 is a plan view illustrating an exemplary embodiment of an LCD panel of the LCD device of FIG. 1.
Figure 3:
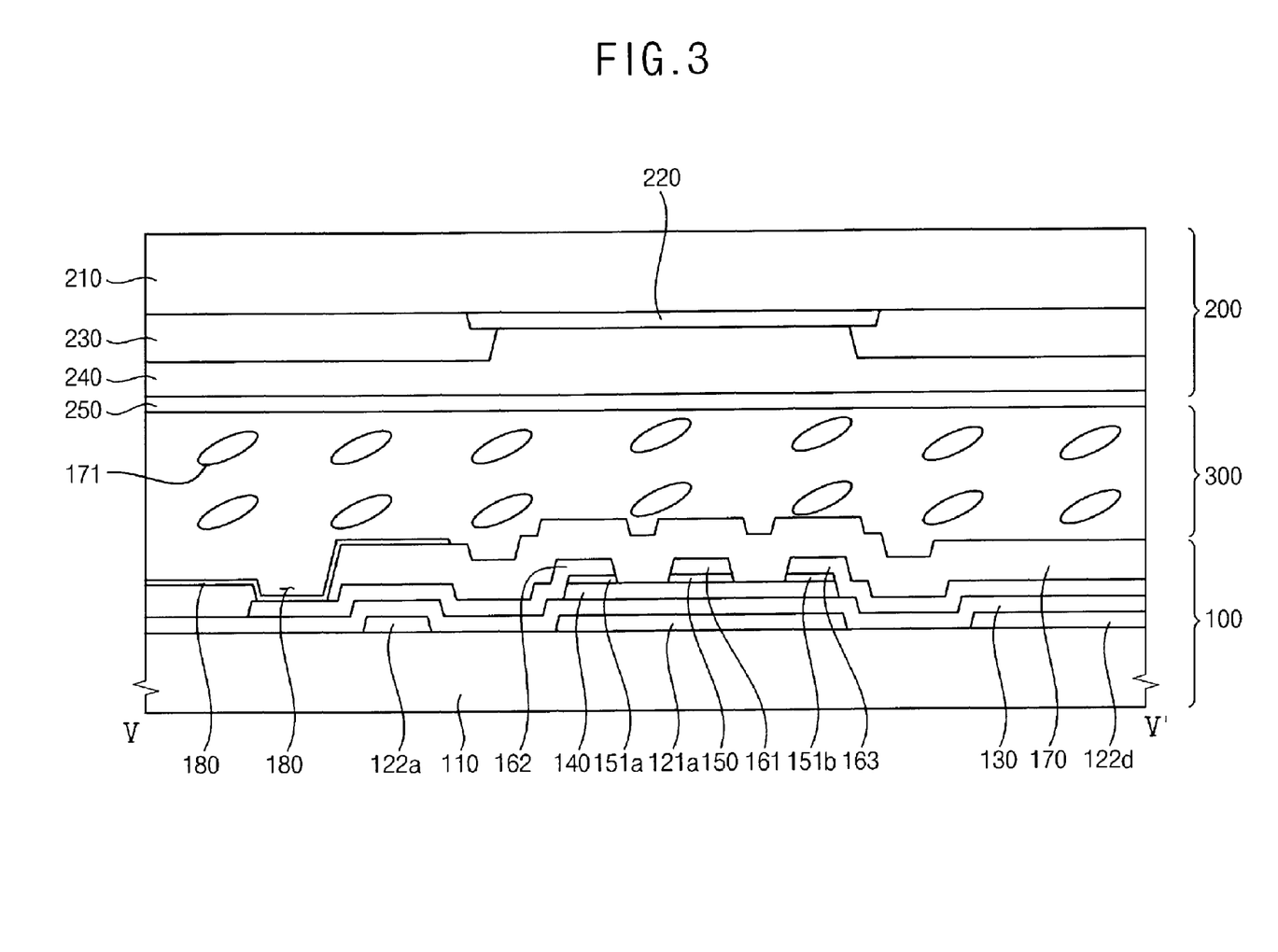
FIG. 3 is a partial cross-sectional view taken along line V-V' of FIG. 2.
Figure 4:
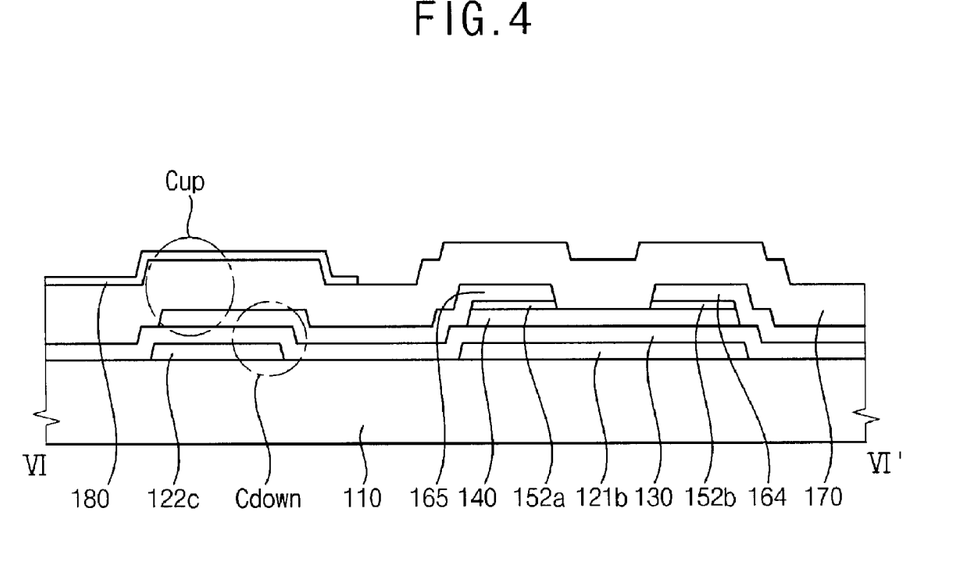
FIG. 4 is a partial cross-sectional view taken along line VI-VI' of FIG. 2.

FIG. 2 is a plan view illustrating an exemplary embodiment of an LCD panel of the LCD device of FIG. 1. FIG. 3 is a partial cross-sectional view taken along line V-V' of FIG. 2. FIG. 4 is a partial cross-sectional view taken along line VI-VI' of FIG. 2.

Referring to FIGS. 2-4, in a first display substrate 100 according to an exemplary embodiment, an (n)-th gate line GLn and a (n+1)-th gate line GLn+1 are formed on a first insulation substrate 110 in the first direction. In an exemplary embodiment, the first insulation substrate 110 includes an optically transparent and electrically conductive material such as glass and/or plastic, for example, but is not limited thereto.

Portions of the (n)-th and (n+1)-th gate lines GLn and GLn+1 extend upward, e.g., in substantially the second direction, to form a first gate electrode 121a and a second gate electrode 121b. The first gate electrode 121a is a control terminal of the first TFT T1 and the second TFT T2, and the second gate electrode 121b is a control terminal of a connection transistor Tc. Shapes of the first gate electrode 121a and the second gate electrode 121b are not limited to the structure shown in FIG. 2 in alternative exemplary embodiments. Rather, the first gate electrode 121a and the second gate electrode 121b may be formed in various different shapes than those shown in FIG. 2 in alternative exemplary embodiments of the present invention.

A gate line end terminal 123 is formed at a first end portion of the gate line, as shown in FIG. 2. The gate line end terminal 123 receives a gate signal input from another layer or an external source, for example, but is not limited thereto.

Figure 5:
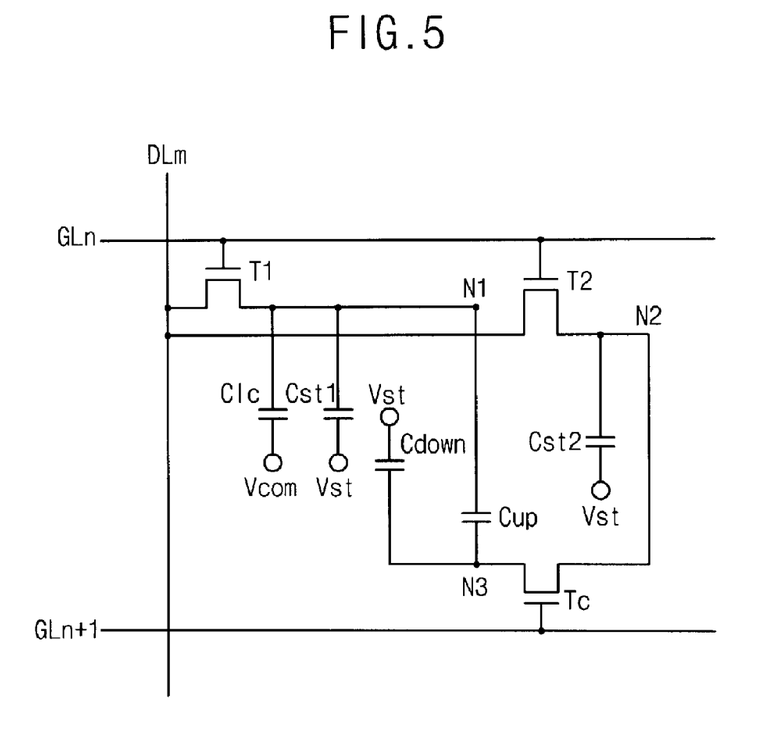
FIG. 5 is an equivalent schematic circuit diagram illustrating an exemplary embodiment of a pixel element of the LCD device of FIG. 1.

A storage line 122 is formed on the first insulation substrate 110. In an exemplary embodiment, the storage line 122 is formed from the same material of, and/or as an extension of, the (n)-th gate line GLn, but alternative exemplary embodiments are not limited thereto. The storage line 122 includes a first portion 122a, a second portion 122b, a third portion 122c, and a fourth portion 122d. The first portion 122a and the second portion 122b overlap a pixel electrode 180 to form a first storage capacitor Cst1 (FIG. 2). The third portion 122c overlaps an extension part 167c of a third drain electrode 165 to form a voltage down capacitor Cdown (FIG. 5). The fourth portion 122d overlaps an extension part 167b of a second drain electrode 163 to form a second storage capacitor Cst2

(FIG. 2). The pixel electrode 180 and the extension part 167c of the third drain electrode 165 overlap to form a voltage up capacitor Cup (FIG. 5).

The first storage capacitor Cst1 maintains a data voltage applied to the pixel electrode 180, and the voltage up capacitor Cup and the second storage capacitor Cst2 increase a voltage applied to the pixel electrode 180 when the LCD device according to an exemplary embodiment is driven.

The (m)-th data line DLm is isolated from the (n)-th gate line GLn and the (n+1)-th gate line GLn+1 and crosses the (n)-th gate line GLn and the (n+1)-th gate line GLn+1 in the second direction, as shown in FIG. 2.

A portion of the (m)-th data line DLm extends in substantially the first direction to form a first source electrode 161 on a semiconductor layer 140, and a first drain electrode 162 is formed on the semiconductor layer 140 spaced apart from the first source electrode 161. In addition, the second drain electrode 163 overlaps the semiconductor layer 140 apart from the first source electrode 161 and the first drain electrode 162, as shown in FIGS. 2 and 3.

The first drain electrode 162 is electrically connected to the pixel electrode 180 via a contact hole 171. The first drain electrode 162 charges a data voltage applied from the (m)-th data line DLm into the pixel electrode 180.

In an exemplary embodiment, the second drain electrode 163 is formed from the same material of, and/or as an extension of, the (m)-th data line DLm, but alternative exemplary embodiments are not limited thereto. As described in greater detail above, the second drain electrode 163 overlaps the fourth portion 122d of the storage line 122 to form the second storage capacitor Cst2. The second drain electrode 163 increases a voltage of the pixel electrode 180 by transferring charges charged in the second storage capacitor Cst2 to the third drain electrode 165 through the connecting transistor Tc, when the second gate electrode 121b of the (n+1)-th gate line GLn+1 turns on the connecting transistor Tc.

The pixel electrode 180 is formed in a pixel area. In an exemplary embodiment, the (n)-th gate line GLn, the (n+1)-th gate lines GLn+1, the (m−1)-th data line DLm−1, and the (m)-th data line DLm define the pixel area; however, the pixel area may be defined in other ways in alternative exemplary embodiments.

In an exemplary embodiment, the pixel electrode 180 has a shape which overlaps the first portion 122a and the second portion 122b of the storage line 122 to form the first storage capacitor Cst1, as described above in greater detail. In alternative exemplary embodiments, an alignment layer (not shown) may be formed on the pixel electrode 180.

Hereinafter, materials of each layer which form the first display substrate 100 will be described in further detail with reference to FIGS. 2-4.

The (n)-th gate line GLn, the (n+1)-th gate line GLn+1, the first gate electrode 121a, the second gate electrode 121b and the storage line 122 are formed from a gate metal film. In an exemplary embodiment, the gate metal film includes an aluminum (Al) series metal such as aluminum or an aluminum alloy, for example, a silver (Ag) series metal such as silver or a silver alloy, for example, a copper (Cu) series metal such as copper or a copper alloy, for example, a molybdenum (Mo) series metal such as molybdenum or a molybdenum alloy, for example, and a metal including chromium (Cr), titanium (Ti), tantalum (Ta), tungsten (W), silver (Ag), copper (Cu), or an alloy thereof, for example, but alternative exemplary embodiments of the present invention are not limited to the above-mentioned materials.

In an exemplary embodiment, the gate metal film includes a multilayer structure which includes at least two different electrically conductive films (not shown). One of the conductive films may include a low resistivity metal such as an aluminum (Al) series metal, a silver (Ag) series metal, or a copper (Cu) series metal, for example, to decrease a signal delay or a voltage drop. Another conductive film may include a material having superior adhesive characteristics with indium tin oxide ("ITO") and/or with indium zinc oxide ("IZO"), such as a molybdenum (Mo) series metal, chromium (Cr), titanium (Ti), or tantalum (Ta), for example. One combination of the gate metal film may include a lower layer of chromium and an upper layer of aluminum, for example, but alternative exemplary embodiments are not limited thereto. For example, another combination of the gate metal film may include a lower layer of aluminum and an upper layer of molybdenum.

A gate insulation layer 130 which includes a silicon nitride ("SiNx"), for example, is formed on the (n)-th gate line GLn, the (n+1)-th gate line GLn+1, the first gate electrode 121a, the second gate electrode 121b, and the storage line 122. The semiconductor layer 140 includes hydrogenated amorphous silicon, polysilicon, for example, and is formed on the gate insulation layer 130, as shown in FIGS. 3 and 4. The semiconductor layer 140 may be formed to have a variety of shapes such as a "T" or island shape, or a bar shape, for example, but alternative exemplary embodiments are not limited thereto. In the exemplary embodiment shown in FIG. 2, the semiconductor layer 140 is formed on the first gate electrode 121a and the second gate electrode 121b in an island shape, e.g., the shape of a "T". When the semiconductor layer 140 has a bar shape (not shown), the semiconductor layer 140 may be positioned below the (m)-th data line DLm to extend along an upper portion of the first gate electrode 121a and the second gate electrode 121b.

Ohmic contact layers 150, 151a, 151b, 152a, and 152b formed on the semiconductor layer 140 include n+ hydrogenated amorphous silicon ("n+a-Si:H") formed by implanting silicide or n+ impurities at a high concentration. In an exemplary embodiment, the ohmic contact layers 150, 151a, and 152a have an island shape, and are positioned below the first drain electrode 162, the second drain electrode 163 and the third drain electrode 165, as well as below the first source electrode 161 and a second source electrode 164. In contrast, the ohmic contact layers 151b and 152b have a bar shape, and are formed substantially in parallel with the (m)-th data line DLm.

The (m)-th data line DLm, the first source electrode 161, the second source electrode 164, the first drain electrode 162, the second drain electrode 163 and the third drain electrode 165 are formed on the ohmic contact layers 150, 151a, 151b, 152a, and 152b and the gate insulation layer 130. The (m)-th data line DLm is extended along the second direction and crosses the (n)-th gate line GLn. The first source electrode 161 is formed on the ohmic contact layer 150.

A data line end terminal 166 is formed at an end portion of each data line of the plurality of data lines DL1 to DLm, and receives a data signal from another layer or an outside source to transmit the data signal to the respective data line of the plurality of data lines DL1 to DLm. The data line end terminal 166 may have an enlarged width, as shown in FIG. 2, to facilitate connecting the data line end terminal 166 to an outside circuit. The first drain electrode 162, the second drain electrode 163 and the third drain electrode 165 are spaced apart from the first source electrode 161 and the second source electrode 164 to be formed on the ohmic contact layers 150, 151a, 151b, 152a, and 152b. For example, the first drain electrode 162 and the second drain electrode 163 are spaced apart from the first source electrode 161, and the third drain electrode 165 is spaced apart from the second source electrode 164, as shown in FIG. 3.

In an exemplary embodiment, the (m)-th data line DLm, the data line end terminal 166, the first drain electrode 162, the second drain electrode 163 and the third drain electrode 165, as well as the first source electrode 161 and the second source electrode 164, are formed from a data metal film, for example, but alternative exemplary embodiments are not limited thereto. The data metal film may include a fire resistant material such as chromium (Cr), a molybdenum (Mo) series metal, tantalum (Ta), or titanium (Ti), for example. The data metal film may further include a multilayer structure which includes a lower layer (not shown), e.g., the above-mentioned fire resistant material, and an upper layer (not shown) of a low resistivity metal. For example, the data metal film in an exemplary embodiment may include chromium (Cr) and aluminum (Al) sequentially formed on the chromium (Cr). In an alternative exemplary embodiment, the data metal film may include aluminum (Al) and molybdenum (Mo) sequentially formed on the aluminum (Al). In yet another alternative exemplary embodiment, the data metal film may include a triple layer structure, a quadruple layer structure or any other configuration utilized in place of or in conjunction with the single layer structure. When the data metal film includes the triple layer structure, aluminum (Al) of a middle layer is formed on molybdenum (Mo) of a lower layer, and then molybdenum (Mo) of an upper layer is sequentially formed on the aluminum (Al) of the middle layer, for example.

As shown in FIGS. 3 and 4, the first source electrode 161, the second source electrode 164, the first drain electrode 162, the second drain electrode 163, and the third drain electrode 165 overlap at least a portion of the semiconductor layer 140. More specifically, the ohmic contact layers 150, 151a, 151b, 152a, and 152b are disposed between the semiconductor layer 140 and the first source electrode 161, the first drain electrode 162, the second drain electrode 163, the third drain electrode 165, and the second source electrode 164, respectively, decreasing contact resistance therebetween.

In an exemplary embodiment, end parts of the first drain electrode 162, the second drain electrode 163, and the third drain electrode 165 are formed in a bar shape and have the extension parts 167a, 167b, and 167c, respectively, thereof. The bar shape end parts overlap the semiconductor layer 140. The extension parts 167a, 167b, and 167c extend from each respective bar shape end part, as shown in FIG. 2. A passivation layer 170 is formed on the semiconductor layer 140 exposed by the first source electrode 161, the second source electrode 164, the first electrode 162, the third drain electrode 163 and the third drain electrode 165.

In an exemplary embodiment, the passivation layer 170 includes an inorganic material, an organic material, and/or a low dielectric constant insulation material. The inorganic material may include SiNx and/or silicon oxide ("SiOx"). The organic material may have photosensitivity and good planarization property. The low dielectric constant insulation material may include a material such as a-Si:C:O and/or a-Si:O:F, for example, and may be manufactured, for example, by plasma enhanced chemical vapor deposition ("PECVD").

In an exemplary embodiment as described herein, the passivation layer 170 includes a single layer structure. In an alternative exemplary embodiment, however, the passivation layer 170 may include a double layer structure to maintain superior characteristics of an organic layer and to protect exposed portions of the semiconductor layer 140. When the passivation layer 170 includes the double layer structure, the passivation layer 170 may further include a lower inorganic layer and an upper organic layer formed on the lower inorganic layer, for example, but alternative exemplary embodiments are not limited thereto.

The passivation layer 170 may further include a color filter layer including, for example, a red filter, a green filter, and a blue filter.

Contact holes 171 and 176 are formed through the passivation layer 170 and expose the extension part 167a and the data line end terminal 166, respectively. A contact hole 173 is formed through the passivation layer 170 and the gate insulation layer 130 to expose the gate line end terminal 123. The pixel electrode 180 is electrically connected to the first drain electrode 162 through the contact hole 171, as shown in FIG. 1. In an exemplary embodiment, the pixel electrode 180 includes an optically transparent and electrically conductive material such as ITO or indium zinc oxide IZO, for example, and an optically reflective and electrically conductive material such as aluminum (Al), for example.

Referring now to FIG. 3, the pixel electrode 180 is electrically connected to the first drain electrode 162 through the contact hole 171 to receive a data voltage from the (m)-th data line DLm. Moreover, the pixel electrode 180 and a common electrode layer 250 of a second display substrate 200 generate an electronic field in a liquid crystal layer 300 therebetween. As a result, an arrangement of liquid crystal molecules 310 of the liquid crystal layer 300 is varied based on the generated electric field, thereby displaying a desired image.

An auxiliary gate line end terminal 183 (FIG. 2) and an auxiliary data line end terminal 186 (FIG. 2) are formed on the passivation layer 170 (FIGS. 3 and 4), both of which are connected to the gate line end terminal 123 and the data line end terminal 166, respectively, through the contact holes 173 and 176, respectively. In an exemplary embodiment, the auxiliary gate line end terminal 183 and the auxiliary data line end terminal 186 each include an optically transparent and electrically conductive material such as ITO or IZO, for example, but are not limited thereto, and an optically reflective and electrically conductive material such as aluminum (Al), for example. The auxiliary gate line end terminal 183 and the auxiliary data line end terminal 186 increase adhesiveness between the gate line end terminal 123 and the data line end terminal 166, respectively, and another layer or an outside device, for example, to protect the gate line end terminal 123 and the data line end terminal 166.

The second display substrate 200 will now be described in further detail with reference to FIG. 2. In an exemplary embodiment, the second substrate 200 includes a second insulation substrate 210 as, for example, a base substrate. The second insulation substrate 210 includes an optically transparent and electrically conductive material such as glass or plastic, for example, but alternative exemplary embodiments are not limited thereto.

A black matrix 220 is formed on the second insulation substrate 210. The black matrix 220 overlaps at least a portion of each of the (n)-th gate line GLn, the (n+1)-th gate line GLn+1, the (m−1)-th data line DLm−1 and the (m)-th data line DLm of the first display substrate 100. A color filter layer 230 is formed in an area at least a periphery of which is substantially surrounded by the black matrix 220. The color filter layer 230 is arranged to substantially overlap the pixel electrode 180 of the first display substrate 100, as shown in FIG. 3.

An overcoating layer 240 is formed on the black matrix layer 220 and the color filter layer 230 to planarize a step difference between the black matrix 220 and the color filter layer 230. A common electrode layer 250 is formed on the overcoating layer 240 and includes an optically transparent and electrically conductive material such as ITO or IZO, for example, but is not limited thereto. In an exemplary embodiment of the present invention, the common electrode layer 250 is substantially fully formed on the second display substrate 200. Further, in an alternative exemplary embodiment, an alignment layer (not shown) may also be formed on the common electrode layer 250.

A method of driving of the LCD device according to an exemplary embodiment of the present invention will now be described in further detail with reference to FIGS. 5 and 6.

FIG. 5 is an equivalent schematic circuit diagram illustrating an exemplary embodiment of a pixel element of the LCD device of FIG. 1. FIG. 6 is a waveform timing diagram illustrating signals according to an exemplary embodiment of a method of driving the LCD device of FIG. 1.

Figure 6:
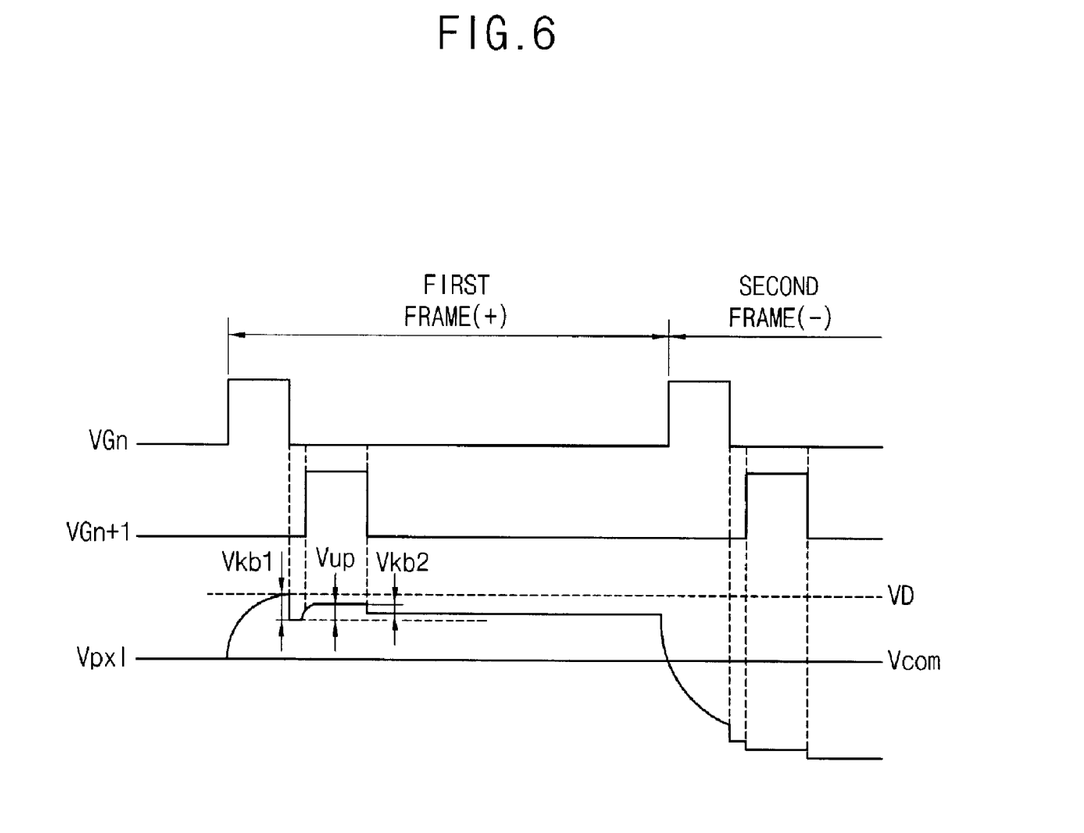
FIG. 6 is a waveform timing diagram illustrating signals according to an exemplary embodiment of a method of driving the LCD device of FIG. 1.

Referring to FIG. 6, a data voltage VD is inverted with respect to a common electrode voltage Vcom on a frame basis, and is then applied to an (m)-th data line DLm (FIG. 5). For purposes of illustration with respect to FIG. 6, it is assumed that the common electrode voltage Vcom is approximately 4 V, the data voltage VD applied to the data line DLm is approximately 6 V during a first frame interval, e.g., a positive polarity ("+") frame, and the data voltage applied to the data line DLm is approximately 2 V during a second frame interval, e.g., a negative polarity ("−") frame. Moreover, it is assumed that a voltage at a third node N3 (FIG. 5) is approximately 1 V before the second frame interval begins. A waveform of a pixel voltage Vpxl applied to a pixel electrode 180 (FIGS. 2-4) during the first frame interval will now be described in further detail.

Referring to FIGS. 5 and 6, when an (n)-th gate on signal VGn is applied to an (n)-th gate line GLn, the first TFT T1 and the second TFT T2 are turned on, and the data voltage VD of approximately 6V applied to the (m)-th data line DLm is thereby charged into the pixel electrode 180, e.g., a potential at a first node N1 and at a second node N2 which corresponds to a drain electrode of the second TFT T2 increase when the data voltage VD of approximately 6V applied to the (m)-th data line DLm. Thus, a voltage level of the first node N1 and the second node N2 is approximately 6V, e.g., is substantially equal to the data voltage VD.

Accordingly, a potential of approximately 2V is charged into the liquid crystal capacitor Clc, the first storage capacitor Cst1 and the second storage capacitor Cst2. More specifically, the potential of approximately 2V is a voltage difference VD-Vcom, e.g., a voltage difference between the pixel electrode (the first node N1) and the drain electrode of the second TFT T2 (the second node N2) and the common electrode voltage Vcom. The voltage up capacitor Cup charges to approximately 5V due to a voltage difference between the first node N1 and the third node N3, and the voltage down capacitor Cdown charges to approximately 3V due to a voltage difference between the third node N3 and the common electrode voltage Vcom.

When a gate off signal is applied to the (n)-th gate line GLn, the first TFT T1 and the second TFT T2 are turned off, and a voltage of the pixel electrode, e.g., a voltage at the first node N1, and a voltage at the drain electrode of the second TFT T2 (the second node N2) decreases by a first kickback voltage Vkb1 due to a voltage drop of a gate electrode of each of the first TFT t1 and the second TFT T2. Thus, the liquid crystal capacitor Clc and the first storage capacitor Cst1 each charge to a different voltage, e.g., a voltage substantially equal to (VD−Vcom)−Vkb1.

Then, when an (n+1)-th gate on signal VGn+1 is applied to an (n+1)-th gate line GLn+1, portions of the charge charged into the drain electrode of the second TFT T2, e.g., the second node N2, are moved to a drain electrode of a connection transistor Tc through the connecting transistor Tc an a voltage at the third node N3 thereby increases by an increased voltage Vup (from approximately 1 V). Thus, due to a coupling affect, in an exemplary embodiment approximately 4V is charged into the voltage up capacitor Cup, and a voltage at the first node N1 is increased approximately as much as approximately the increased voltage Vup.

As a voltage at the first node N1 increases, the charge voltage (VD−Vcom)−Vkb1 at the liquid crystal capacitor Clc and the first storage capacitor Cst1 is increased by the approximately voltage Vup, e.g., to a voltage of approximately (VD−Vcom)−Vkb1+Vup.

In an exemplary embodiment in which approximately 3V is charged into the voltage down capacitor Cdown, a first terminal of the drain electrode of the second TFT T2 (e.g, the second node N2) is electrically connected to the storage line 122; as a result, the approximately 3V charged into the voltage down capacitor Cdown is instantaneously decreased due to charge sharing therebetween.

Then, when a gate off signal is applied to the (n+1)-th gate line GLn+1, a voltage at the pixel electrode 180 (e.g., the first node N1) decreases by a second kickback voltage Vkb2, and the liquid crystal capacitor Clc and the first storage capacitor Cst1 are thereby charged to a voltage (VD−Vcom)−Vkb1+Vup−Vkb2.

As a result, during the first frame interval, a high voltage (VD−Vcom)−Vkb1+Vup−Vkb2 is induced by the voltage up capacitor Cup into the pixel electrode 180, which is higher than a voltage (VD−Vcom)−Vkb1 corresponding to the data voltage VD.

Moreover, the increased voltage Vup at the first node N1 may be varied based on a capacitance of each capacitor shown in FIG. 5. More specifically, In an exemplary embodiment of the present invention, a capacitance of the second storage capacitor Cst2 is approximately 0.3 times to approximately 4.0 times a total capacitance of the liquid crystal capacitor Clc and the first storage capacitor Cst1, and a capacitance of the voltage down capacitor Cdown is approximately 0.05 times to approximately 1.0 times a capacitance of the second storage capacitor Cst2. Furthermore, in an exemplary embodiment, a capacitance of the voltage up capacitor Cup is approximately 0.05 times to approximately 1.0 times a total capacitance of the liquid crystal capacitor Clc and the first storage capacitor Cst1, and a capacitance of the first storage capacitor Cst1 is approximately 0 times to approximately 2.0 times a capacitance of the liquid crystal capacitor Clc.

Still referring to FIG. 6, when a voltage of approximately 2V is applied to the (m)-th data line DLm during the second frame interval, a waveform shown in FIG. 6 is developed. Operation of the LCD device in the second frame interval is substantially the same as described above in greater detail with respect to the first frame interval, and a repetitive description thereof will be omitted.

In yet another alternative exemplary embodiment, a method for driving a liquid crystal display device includes controlling a first TFT T1 with an (n)-th gate line GLn, controlling a second TFT T2 with the (n)-th gate line GLn, and controlling a connecting transistor Tc with an (n+1)-th gate line GLn+1. The method further includes, as described above in greater detail, applying a data voltage VD to the first drain electrode and the second drain electrode by turning on the first TFT T1 and the second TFT T2, respectively, when a gate on signal VGn is applied to the (n)-th gate line GLn, and turning on the connecting transistor Tc when a gate on signal VGn+1 is applied to the (n+1)-th gate line GLn+1. As a result, a voltage of the second source electrode decreases based on charge sharing between the second source electrode and the third drain electrode, and the voltage of the second source electrode increases to a value greater than the data voltage VD, due to a coupling effect of the voltage up capacitor Cup.

As described herein, a voltage higher than a data voltage applied to a data line of an LCD device according to an exemplary embodiment of the present invention is induced in a pixel electrode due to charge sharing between a voltage up capacitor and a second storage capacitor. As a result, power consumption of the LCD device according to an exemplary embodiment of the present invention is substantially reduced and/or effectively decreased.

The present invention should not be construed as being limited to the exemplary embodiments set forth herein. Rather, these exemplary embodiments are provided so that this disclosure will be thorough and complete and will fully convey the concept of the present invention to those skilled in the art.

Further, although the present invention has been shown and described with reference to exemplary embodiments thereof, it will be understood by those of ordinary skill in the art that various changes and modifications in form and details may be made therein without departing from the spirit or scope of the present invention as defined by the following claims.

What is claimed is:

1. A display substrate comprising:
    an insulation substrate;
    an (n)-th gate line, where n is a natural number, formed in a first direction on the insulation substrate;
    a data line electrically isolated from the (n)-th gate line and formed in a second direction substantially perpendicular to the first direction;
    a first source electrode which overlaps at least a first portion of the (n)-th gate line and is electrically connected to the data line;
    a first drain electrode and a second drain electrode which each overlap at least a second portion of the (n)-th gate line;
    a pixel electrode electrically connected to the first drain electrode;
    a second source electrode which overlaps at least a first portion of an (n+1)-th gate line, the second source electrode being formed by extending the second drain electrode in substantially the second direction from the (n)-th gate line towards the (n+1)-th gate line;
    a third drain electrode which overlaps at least a second portion of the (n+1)-th gate line; and
    a storage line which overlaps at least one of a first portion of the pixel electrode, a portion of the second drain electrode and a portion of the third drain electrode.

2. The display substrate of claim 1, wherein the pixel electrode is formed in a pixel area.

3. The display substrate of claim 1, further comprising:
    a first storage capacitor which overlaps at least a second portion of the pixel electrode and a first portion of the storage line;
    a voltage down capacitor which overlaps at least a portion of the third drain electrode and a second portion of the storage line;
    a second storage capacitor which overlaps at least a portion of the second drain electrode and a third portion of the storage line; and
    a voltage up capacitor which overlaps at least a third portion of the pixel electrode and at least a portion of the third drain electrode.

4. A liquid crystal display device comprising:
    a first display substrate comprising:
        an insulation substrate;
        an (n)-th gate line, where n is a natural number, formed in a first direction on the insulation substrate;
        a data line electrically isolated from the (n)-th gate line and formed in a second direction substantially perpendicular to the first direction;
        a first source electrode which overlaps at least a first portion of the (n)-th gate line, the first source electrode being electrically connected to the data line;
        a first drain electrode and a second drain electrode which each overlap at least a second portion of the (n)-th gate line;
        a pixel electrode electrically connected to the first drain electrode;
        a second source electrode which overlaps at least a first portion of an (n+1)-th gate line, the second source electrode being formed by extending the second drain electrode in substantially the second direction from the (n)-th gate line towards the (n+1)-th gate line;
        a third drain electrode which overlaps at least a second portion of the (n+1)-th gate line; and
        a storage line which overlaps at least one of a first portion of the pixel electrode, a portion of the second drain electrode, and a portion of the third drain electrode;
    a second display substrate comprising:
        a second insulation substrate; and
        a common electrode formed on the second insulation substrate substantially facing the first insulation substrate; and a liquid crystal layer interposed between the first display substrate and the second display substrate.

5. The liquid crystal display device of claim 4, wherein the pixel electrode is formed in a pixel area.

6. The liquid crystal display device of claim 4, further comprising:
    a liquid crystal capacitor comprising the pixel electrode and the common electrode;
    a voltage up capacitor which overlaps at least a third portion of the pixel electrode and the third drain electrode;
    a first storage capacitor which overlaps at least a second portion of the pixel electrode and a first portion of the storage line;
    a voltage down capacitor which overlaps at least a portion of the third drain electrode and a second portion of the storage line; and
    a second storage capacitor which overlaps at least a portion of the second drain electrode and a third portion of the storage line.

7. The liquid crystal display device of claim 6, further comprising:
    a first thin-film transistor controlled by the (n)-th gate line, the first thin-film transistor comprising the first source electrode as an input terminal and the first drain electrode as an output terminal;
    a second thin-film transistor controlled by the (n)-th gate line, the second thin-film transistor comprising the first source electrode as an input terminal and the second drain electrode as an output terminal; and
    a connecting transistor controlled by the (n+1)-th gate line, the connecting transistor comprising the second source electrode as an input terminal and the third drain electrode as an output terminal.

8. The liquid crystal display device of claim 7, wherein the first thin-film transistor and the second thin-film transistor are turned on and apply a data voltage to the first drain electrode and the second drain electrode, respectively, when a gate on signal is applied to the (n)-th gate line,
  the connecting transistor is turned on when a gate on signal is applied to the (n+1)-th gate line,
  a voltage of the second source electrode decreases based on charge sharing between the second source electrode and the third drain electrode, and
  the voltage of the second source electrode increases to a value greater than a data voltage based on a coupling effect of the voltage up capacitor.

9. The liquid crystal display device of claim 6, wherein a capacitance of the first storage capacitor is in a range of approximately 0 times to approximately 2.0 times a capacitance of the liquid crystal capacitor.

10. The liquid crystal display device of claim 6, wherein a capacitance of the second storage capacitor is in a range of approximately 0.3 times to approximately 4.0 times a total capacitance of the liquid crystal capacitor and the first storage capacitor.

11. The liquid crystal display device of claim 6, wherein a capacitance of the voltage up capacitor is in a range of approximately 0.05 times to approximately 1.0 times a total capacitance of the liquid crystal capacitor and the first storage capacitor.

12. The liquid crystal display device of claim 6, wherein a capacitance of the voltage down capacitor is in a range of approximately 0.05 times to approximately 1.0 times a capacitance of the second storage capacitor.

13. A liquid crystal display device comprising:
  a first thin-film transistor comprising a control terminal electrically connected to an (n)-th gate line and an input terminal electrically connected to a (m)-th data line, where n and m are natural numbers;
  a liquid crystal capacitor comprising a liquid crystal layer electrically connected to an output terminal of the first thin-film transistor;
  a first storage capacitor electrically connected to the output terminal of the first thin-film transistor and the liquid crystal capacitor;
  a second thin-film transistor comprising a control terminal electrically connected to the (n)-th gate line and an input terminal electrically connected to the (m)-th data line;
  a second storage capacitor electrically connected to an output terminal of the second thin-film transistor;
  a connecting transistor comprising a control terminal electrically connected to an (n+1)-th gate line, and an input terminal electrically connected to the second storage capacitor;
  a voltage down capacitor electrically connected to an output terminal of the connecting transistor; and
  a voltage up capacitor electrically connected to the output terminal of the connecting transistor and the output terminal of the first thin-film transistor.

14. The liquid crystal display device of claim 13, wherein a capacitance of the second storage capacitor is in a range of approximately 0.3 times to approximately 4.0 times a total capacitance of the liquid crystal capacitor and the first storage capacitor.

15. The liquid crystal display device of claim 13, wherein a capacitance of the voltage up capacitor is in a range of approximately 0.05 times to approximately 1.0 times a total capacitance of the liquid crystal capacitor and the first storage capacitor.

16. The device of claim 13, wherein a capacitance of the voltage down capacitor is in a range of approximately 0.05 times to approximately 1.0 times a capacitance of the second storage capacitor.

17. A method for driving a liquid crystal display device, the method comprising:
  controlling a first thin-film transistor with an (n)-th gate line, where n is a natural number, the first thin-film transistor comprising a first source electrode as an input terminal and a first drain electrode as an output terminal;
  controlling a second thin-film transistor with the (n)-th gate line, the second thin-film transistor comprising the first source electrode as an input terminal and a second drain electrode as an output terminal; and
  controlling a connecting transistor with an (n+1)-th gate line, the connecting transistor comprising a second source electrode as an input terminal and a third drain electrode as an output terminal,
  wherein
  a voltage of the second source electrode decreases based on charge sharing between the second source electrode and the third drain electrode, and
  the voltage of the second source electrode increases to a value greater than a data voltage based on a coupling effect of a voltage up capacitor.

18. The method of claim 17, further comprising:
  applying a data voltage to the first drain electrode and the second drain electrode by turning on the first thin-film transistor and the second thin-film transistor, respectively, when a gate on signal is applied to the (n)-th gate line; and
  turning on the connecting transistor when a gate on signal is applied to the (n+1)-th gate line.

* * * * *